United States Patent
Zoeller et al.

(10) Patent No.: US 8,177,467 B2
(45) Date of Patent: May 15, 2012

(54) FASTENING DEVICE HAVING FASTENING ELEMENT

(75) Inventors: Angela Zoeller, Munich (DE); Frank Eckstein, Giebelstadt (DE); Albert Sbongk, Niederstetten (DE)

(73) Assignees: Bayerische Motoren Werke Aktiengesellschaft, Munich (DE); ITW Automotive Products GmbH & Co. KG, Creglingen (DE)

( * ) Notice: Subject to any disclaimer, the term of this patent is extended or adjusted under 35 U.S.C. 154(b) by 532 days.

(21) Appl. No.: 12/407,465

(22) Filed: Mar. 19, 2009

(65) Prior Publication Data

US 2009/0238659 A1 Sep. 24, 2009

Related U.S. Application Data

(63) Continuation of application No. PCT/EP2007/007734, filed on Sep. 5, 2007.

(30) Foreign Application Priority Data

Sep. 20, 2006 (DE) .......................... 10 2006 044 074

(51) Int. Cl.
*F16B 37/04* (2006.01)
(52) U.S. Cl. ........................................ 411/175; 411/349
(58) Field of Classification Search .................. 411/119, 411/120, 172, 175, 349, 549, 553, 965; 362/549
See application file for complete search history.

(56) References Cited

U.S. PATENT DOCUMENTS

| | | | | |
|---|---|---|---|---|
| 999,606 A | * | 8/1911 | Stillwell | 411/120 |
| 2,940,558 A | * | 6/1960 | Schlueter | 403/408.1 |
| 3,271,059 A | | 9/1966 | Pearson | |
| 3,574,899 A | * | 4/1971 | Fisher | 411/172 |
| 3,826,458 A | * | 7/1974 | Fisher | 248/239 |
| 4,131,258 A | * | 12/1978 | Okuda et al. | 248/73 |
| 4,284,114 A | * | 8/1981 | Korenobu | 411/119 |

(Continued)

FOREIGN PATENT DOCUMENTS

DE 1 289 367 2/1969

(Continued)

OTHER PUBLICATIONS

International Search Report dated Dec. 4, 2007 with English translation (Five (5) pages).

(Continued)

*Primary Examiner* — Flemming Saether
(74) *Attorney, Agent, or Firm* — Crowell & Moring LLP

(57) ABSTRACT

A fastening device having a fastening element includes a plug-in region and a contact area at a distance therefrom, and a shaft between the plug-in region and the contact area. The plug-in region is axially pressable through a through opening in a wall area in a plugged position of the fastening element, until the contact surface, or an intermediate part situated in between, presses against the wall area from one side and the shaft is radially centered in the through opening. The fastening element is connected to another component. The fastening element is located in its installed position after the fastening element is in its plugged position through the through opening and is then rotated around an axis of its shaft into an installed position delimited by a stop, in which at least one radial projection of the plug-in region engages behind an edge area of the through opening to fix the fastening element in the installed position and thus prevent axial displacement of the shaft out of the through opening.

17 Claims, 2 Drawing Sheets

U.S. PATENT DOCUMENTS

| | | | |
|---|---|---|---|
| 4,685,172 A | | 8/1987 | O'Connor |
| 5,047,906 A | * | 9/1991 | Weber .......................... 362/549 |
| 5,820,322 A | * | 10/1998 | Hermann et al. ............... 411/85 |
| 6,220,734 B1 | * | 4/2001 | Muller .......................... 362/520 |

FOREIGN PATENT DOCUMENTS

| | | |
|---|---|---|
| DE | 26 26 046 A1 | 12/1976 |
| DE | 35 13 641 A1 | 10/1986 |
| DE | 36 15 112 C2 | 11/1986 |
| DE | 36 24 395 A1 | 1/1988 |
| DE | 40 00 517 A1 | 4/1991 |
| DE | 93 14 781.3 G | 11/1993 |
| EP | 1 270 962 A1 | 1/2003 |
| FR | 2 448 652 A1 | 9/1980 |
| GB | 1 526 355 | 9/1978 |

OTHER PUBLICATIONS

German Search Report dated Nov. 21, 2006 with English translation (Nine (9) pages).

* cited by examiner

Fig. 5
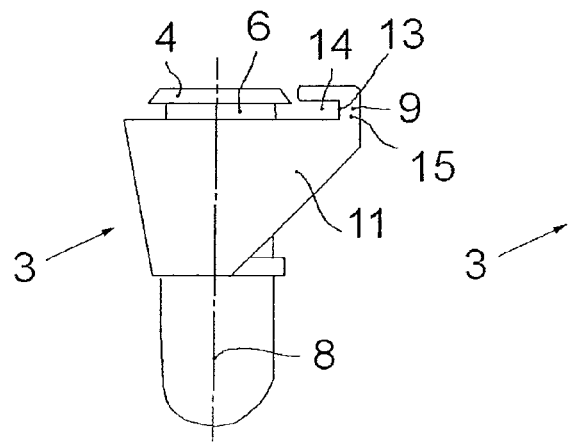
Fig. 6
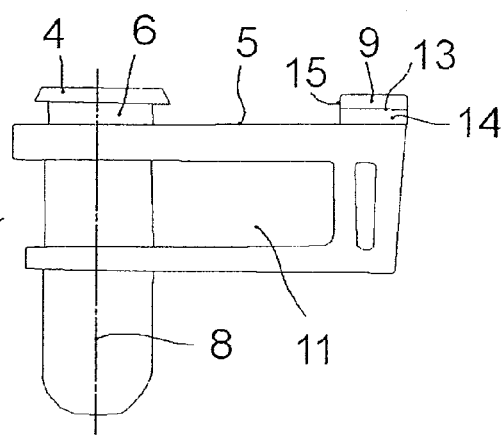
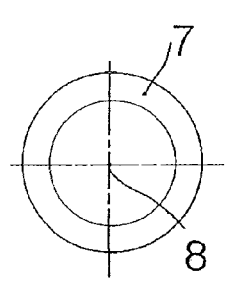
Fig. 7
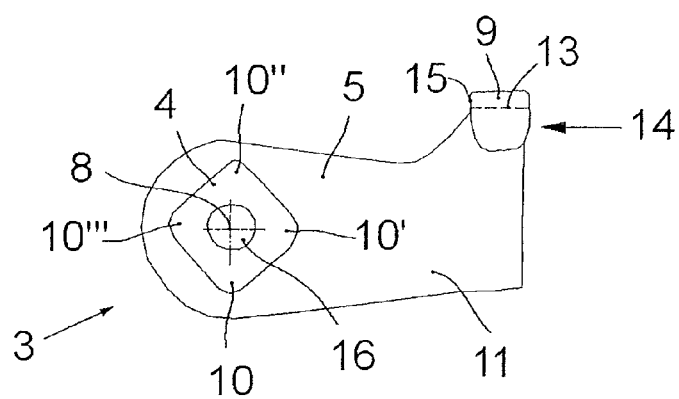
Fig. 8

FASTENING DEVICE HAVING FASTENING ELEMENT

CROSS-REFERENCE TO RELATED APPLICATIONS

This application is a continuation of PCT International Application No. PCT/EP2007/007734, filed Sep. 5, 2007, which claims priority under 35 U.S.C. §119 to German Patent Application No. 10 2006 044 074.9, filed Sep. 20, 2006, the entire disclosures of which are herein expressly incorporated by reference.

BACKGROUND AND SUMMARY OF THE INVENTION

The invention relates to a fastening device having a fastening element, which includes a plug-in region and, at a distance therefrom, a contact surface and a shaft between the plug-in region and the contact surface. The plug-in region is able to be plugged axially through a through opening in a wall area in a plugged position of the fastening element, until the contact surface, or an intermediate part situated in between, presses against the wall area from one side and the shaft is radially centered in the through opening.

A fastening device of this type disclosed in DE 40 00 517 A1 provides a fastening element having a shaft, which has flattened areas, which, after a plug-in region of the fastening element is plugged through a through opening in the wall area until a contact surface of the fastening element presses against the wall area, work together with corresponding counter surfaces in the through opening and thus prevent twisting of the fastening element in the through opening. An axial displacement of the fastening element out of the through opening is prevented by radially elastic spring lugs on the shaft of the fastening element. The lugs engage behind an edge area of the fastening element after the fastening element is inserted into the through opening. A removal of the fastening element is thus only possible using a special tool, which radially compresses the spring lugs and is to be inserted into the through opening or possibly through it at least regionally. The insertion of the fastening element into the through opening is made more difficult, because the spring lugs are to be compressed radially elastically, working together with the edge of the insertion opening, by an axial force to be applied to the fastening element. The spring lugs may only absorb slight axial forces because of their elasticity and do not prevent a displacement of the fastening element out of the through opening in the event of greater forces. The fastening element has an axial through opening which allows a moisture transfer from one side of the wall area to the other side.

The invention provides a fastening device which reliably fixes the fastening element in the through opening even in the event of greater axial forces acting on the fastening element. The inventive fastening device may be installed and uninstalled using small forces, and may completely or at least extensively prevent moisture transfer from one side of the wall area to the other side.

According to the invention, a fastening element having a fastening device includes a plug-in region and, at a distance therefrom, a contact surface and a shaft between the plug-in region and the contact surface. The plug-in region is able to be plugged axially through a through opening in a wall area in a plugged position of the fastening element, until the contact surface, or an intermediate part situated in between, presses against the wall area from one side and the shaft is radially centered in the through opening. The fastening element is to be connected to a component, wherein the fastening element is located in its installed position if the plug-in region of the fastening element is plugged through the through opening in the plugged position and is then rotated around the axis of the shaft into an installed position delimited by a stop, in which at least one radial projection of the plug-in region engages behind an edge area of the through opening and thus prevents an axial displacement of the shaft out of the through opening, as a result of which the fastening element is fixed in the installed position.

The fastening device is thus centered radially in the through opening via its shaft and is fixed in relation to radial forces and strains in both axial directions in a formfitting way in the through opening via its contact surface and the at least one radial projection of the plug-in region plugged through the through opening and rotated into the installed position. For example, using at least one connection element, a component may therefore be connected to the wall area using at least one fastening element, for example, on which even greater radial and/or axial strains to the central axis of the shaft may act. A moisture passage from one side of the wall area to the other side may be extensively or completely prevented by a pocket hole in the fastening element, into which a threaded screw may be screwed to fasten the component on the wall area, for example. A more reliable, complete moisture transfer may at least be prevented if at least one disk seal or component seal is additionally used, for example, which is situated between an assigned side of the wall area and the fastening element and/or the component or an intermediate part.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a view of the fastening element;

FIG. 6 shows a side view of the fastening element;

FIG. 7 shows a top view of a disk seal, which is situated between the contact surface of the fastening element and the wall area after the installation of the fastening element; and FIG. 8 shows an axial top view of the fastening element.

DETAILED DESCRIPTION OF THE DRAWINGS

Figure 1:
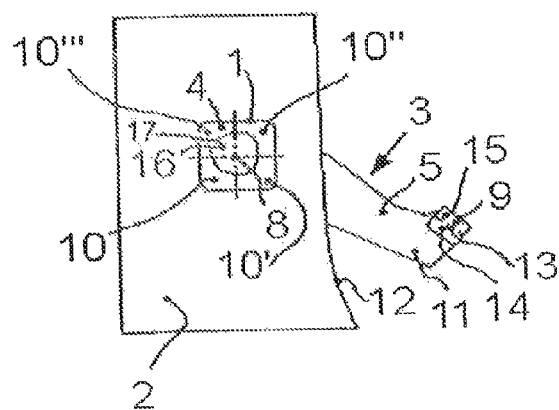
FIG. 1 shows a simplified view of the approximately square through opening, having rounded corner areas, in a wall area, and the fastening element located in its plugged position.

FIG. 1 is a simplified view of a through opening 1, manufactured as approximately square in cross-section having rounded corner areas, in a wall area 2 in the rear area of a motor vehicle.

Figure 2:
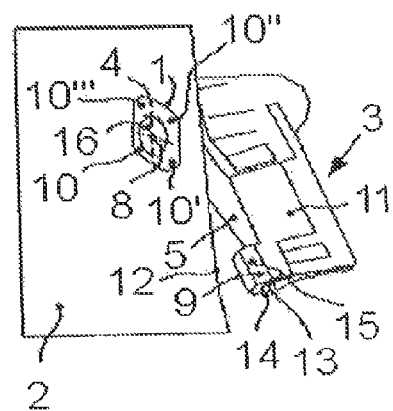
FIG. 2 shows a view corresponding to FIG. 1 from a perspective view.

FIG. 2 is a view corresponding to FIG. 1 from a perspective view.

The wall area 2 recognizable in FIGS. 1 through 4 is situated approximately vertically in the vehicle transverse direction, on which, with the aid of a fastening element 3, a taillight (not shown) without a taillight cover may be fastened by a worker. The worker is positioned to stand and remain behind the vehicle.

The fastening element 3, which is shown separately in various views in each of FIGS. 5, 6, and 8, is used for this purpose, which has a plug-in region 4 and, at a distance therefrom, a contact surface 5. A shaft 6 is arranged between the plug-in region 4 and the contact surface 5.

In the plugged position of the fastening element 3 shown in FIGS. 1 and 2, the plug-in region 4 of the fastening element 3, which is adapted to the approximately square cross-sectional shape of the through opening 1 and also has rounded corners, is plugged axially through the through opening 1 until the contact surface 5 of the fastening element 3 (or an elastic disk seal 7 situated on the shaft 6 of the fastening element 3) comes into contact with a surface of the wall area 2 surrounding the through opening 1 and is pressed against the wall area 2. If used, the disk seal 7 will be at least somewhat elastically compressed. The cross-section of the shaft 6 is adapted to the cross-section of the through opening 1 in such a way that the shaft 6 is then radially centered in the through opening 1.

Figure 3:
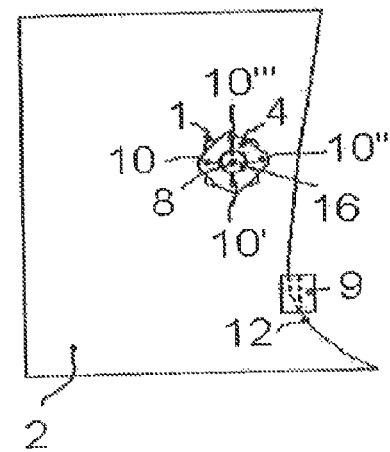
FIG. 3 shows a view corresponding to FIG. 1, in which the fastening element plugged through the through opening using its plug-in region is rotated into an installed position delimited by a stop.
Figure 4:
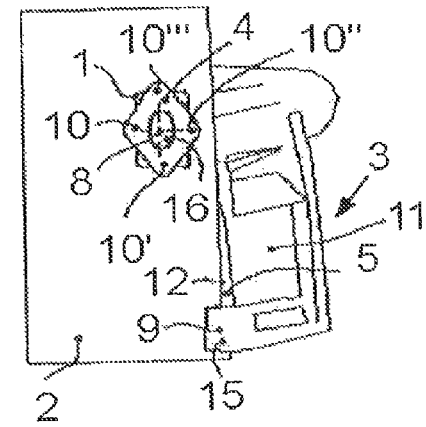
FIG. 4 shows a view corresponding to FIG. 2 with the fastening element rotated into the installed position.

The fastening element 3 may subsequently be brought into its installed position shown in each of FIGS. 3 and 4. For this purpose, after the plug-in region 4 of the fastening element 3 is pressed through the through opening 1, the fastening element 3 is rotated around the axis 8 of the shaft 6 into an installed position delimited by a stop 9. In the stop position, the radial projections 10, 10', 10", 10''' formed by the corner areas of the plug-in region 4 each engage behind an edge area of the approximately square through opening 1 and thus prevent an axial displacement of the shaft 6 out of the through opening 1, by which the fastening element 3 is fixed in the installed position corresponding to FIGS. 3 and 4.

The stop 9 is implemented at a radial distance from the central axis 8 of the shaft 6 on a lever arm 11 of the fastening element 3. The stop 9 is formed by a bottom surface 13 of a slot 14 in a projection 15 of the lever arm 11, which works together in the installed position with an edge surface area 12 of the wall area 2. The slot 14 has a width at least corresponding to the thickness of the edge surface area 12. The fastening element 3 is manufactured from a plastic. The fastening element 3 has a pocket hole 16 coaxial to the central axis 8 of the shaft 6, which is open on the front side of the plug-in region 4. A threaded screw 17 (FIG. 1), may be screwed into the pocket hole 16, which is loaded using the previously specified taillight (also not shown) without a taillight cover against the wall area 2.

Either the pocket hole 16 has an internal thread adapted to the external thread of the threaded screw (not shown) or the threaded screw cuts an internal thread into the pocket hole 16 corresponding to the external thread of the threaded screw as it is screwed into the pocket hole 16. The disk seal 7 shown in FIG. 7 is situated coaxially with the axis 8 of the shaft 6 on the shaft 6. After the installation of the fastening element, the disk seal is located axially between the contact surface 5 of the fastening element 3 and one side of the wall area 2, and thus seals the through opening 1 from a front side.

Upon the fastening of the fastening element 3 and then the taillight (not shown) without a taillight cover on the wall area via a least one threaded screw screwed into the installed fastening element 3, the threaded screw penetrates a fastening opening in the taillight and a disk-shaped component seal, which is located axially between the taillight and the front side of the plug-in region 4 of the fastening element 3 facing toward it and/or the front side of the wall area 2 facing toward it. The component seal is identical to the disk seal shown in FIG. 7 in the exemplary embodiment.

The through opening in the wall area may have a non-round, regular, or irregular cross-section or at least one radial expansion originating from a round cross-section. The plug-in region of the fastening element may be adapted to the cross-section of the through opening. However, this is not absolutely necessary. The through opening and the plug-in region of the fastening element may have a cross-section which is possibly provided with rounded corners and/or rounded edges, for example, arbitrarily deviating from the rectangular cross-section of the exemplary embodiment independently of one another. Moreover, it is not necessary for the shaft to have a circular cross-section as in the exemplary embodiment.

The fastening element may be manufactured from an arbitrary plastic or from another material, for example, from metal. Complete tightness may be achieved at the through opening using the fastening device. In the installed position, the fastening element may absorb very high forces, which may be greater than or equal to the forces necessary for destroying the wall area. A very high torque may also act on the fastening element, which loads a stop against an edge surface area of the wall area. A mounting of the fastening element and the component may be performed without aid from one side, for example, from the rear side of a motor vehicle if the wall area is a rear wall of a motor vehicle. The fastening element is situated so it is twist-locked extremely strongly in at least one rotational direction. By a simple measure, which prevents a removal of the stop from the wall surface area, a secure twist lock may be achieved in both rotational directions around the axis of the shaft of the fastening element.

The fastening element is to be attached captively to the wall area before the installation of the component, so that the transportable wall area may be, for example, transported to the unfinished vehicle body of a motor vehicle at various positions. A reliable seal of the through opening via a seal, for example, only requires a small installation space for the seal. A stop plate or the like is not necessary. The fastening element is fixed in a formfitting way in the through opening. The stop may be designed differently and may be adapted to the design requirements.

The stop may also be formed by a pin or projection, for example. Upon a replacement or uninstallation and/or installation of the component, the fastening element may remain in its installed position. The cross-sectional shape of the through opening is arbitrary per se. The length of the pocket hole and the wall thickness of the fastening element as well as a threaded screw which may be screwed into the pocket hole may be adapted to the variant to be expected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A fastening element comprising:
a plug-in region;
a contact surface arranged at a distance from the plug-in region;
a shaft between the plug-in region and the contact surface, the plug-in region being pressable axially through a through opening in a wall area in a plugged position of the fastening element up until the contact surface or an intermediate part arranged in between the plug-in region and the contact surface presses one side of the wall area, the shaft being radially centered in the through opening;
a stop configured on the fastening element to delimit an installed position of the fastening element when the plug-in region is pressed through the through opening in the plugged position and is rotated about an axis of the shaft into the installed position;
at least one radial projection of the plug-in region which, in the installed position delimited by the stop, engages behind an edge area of the through opening to prevent axial displacement of the shaft from the through opening in order to fix the fastening element in the installed position;
wherein the fastening element is configured for connection with another component;
wherein the stop is configured at a radial distance from the axis of the shaft on a lever arm of the fastening element, and the stop cooperates with an edge surface area of the wall area in the installed position; and
wherein the component is attached to the fastening element by at least one threaded screw screwed into the fastening element.

2. The fastening element according to claim 1, wherein the intermediate part is operatively arranged between the contact surface and the wall area, such that the contact surface presses the wall area through the intermediate part.

3. The fastening element according to claim 2, wherein the stop is configured at a radial distance from the axis of the shaft on a lever arm of the fastening element.

4. The fastening element according to claim 3, wherein the stop comprises a bottom surface of a slot in a projection of the lever arm, which bottom surface works together in the installed position with an edge surface area of the wall area, and the slot has a width at least corresponding to a thickness of the edge surface area.

5. The fastening element according to claim 2, wherein the stop comprises a bottom surface of a slot in a projection of the lever arm, which bottom surface works together in the installed position with an edge surface area of the wall area, and the slot has a width at least corresponding to a thickness of the edge surface area.

6. The fastening element according to claim 2, wherein the fastening element has a pocket hole coaxial to the axis of the shaft, which is open on a front side of the plug-in region and into which the threaded screw is screwable, the component being loadable toward the wall area via the threaded screw.

7. The fastening element according to claim 1, wherein the fastening element is manufactured from a plastic.

8. The fastening element according to claim 1, wherein the fastening element has a pocket hole coaxial to the axis of the shaft, which is open on a front side of the plug-in region and into which the threaded screw is screwable, the component being loadable toward the wall area via the threaded screw.

9. The fastening element according to claim 8, wherein either the pocket hole has an internal thread adapted to the external thread of the threaded screw or the threaded screw cuts an internal thread corresponding to the external thread of the threaded screw when screwed into the pocket hole.

10. The fastening element according to claim 1, wherein the intermediate part comprises a disk seal situated on the shaft, which, after the installation of the fastening element, is axially located between the contact surface of the fastening element and one side of the wall area in order to seal the through opening from a front side.

11. The fastening element according to claim 10, wherein, when the component is connected, the threaded screw penetrates a fastening opening in the component and a disk-shaped component seal, the disk-shaped component seal being axially located between the component and at least one of the front side of the plug-in region facing toward the component and the front side of the wall area facing toward the component.

12. The fastening element according to claim 1, wherein the through opening has a non-round, regular, or an irregular cross-section, or at least one radial expansion originating from a round cross-section, and the plug-in region of the fastening element has a shape adapted to the cross-section of the through opening.

13. The fastening element according to claim 1, wherein the through opening and the plug-in region of the fastening element have a rectangular cross-section.

14. The fastening element according to claim 13, wherein the rectangular cross-section of the through opening and the plug-in region includes rounded corners.

15. A fastening element comprising:
a plug-in region;
a contact surface arranged at a distance from the plug-in region;
a shaft, part of which is arranged between the plug-in region and the contact surface, the shaft having a central axis;
a stop arranged at a radial distance from the central axis of the shaft on a lever arm of the fastening element;
at least one radial protrusion extending from the plug-in region;
wherein the plug-in region is pluggable axially through an opening in a wall region until the contact surface or an intermediate part disposed in between comes to rest on the wall region from one side and the shaft is radially centered in the opening;
wherein the fastening element assumes an installation position after being rotated about the central axis of the shaft when in the plug-in position such that the stop delimits the rotation, and wherein in the installation position, the at least one radial protrusion engages in an edge region of the opening to prevent axial displacement of the shaft from the through opening in order to retain the fastening element;
wherein the stop cooperates with an edge surface area of the wall area in the installed position; and
wherein the component is attached to the fastening element by at least one threaded screw screwed into the fastening element.

16. The fastening element according to claim 15, further comprising a pocket hole arranged on the shaft in the plug-in region, the pocket hole being operatively configured to allow for the connection of a further component.

17. A vehicle, comprising:
at least one wall area having a through opening;
a component mountable on the wall area;
a fastening element for use with the wall area, the fastening element comprising:
a plug-in region;
a contact surface arranged at a distance from the plug-in region;
a shaft between the plug-in region and the contact surface, the plug-in region being pressable axially through the through opening in a plugged position of the fastening element up until the contact surface or an intermediate part arranged in between the plug-in region and the contact surface presses one side of the wall area, the shaft being radially centered in the through opening;

a stop configured on the fastening element to delimit an installed position of the fastening element when the plug-in region is pressed through the through opening in the plugged position and is rotated about an axis of the shaft into the installed position;

at least one radial projection of the plug-in region which, in the installed position delimited by the stop, engages behind an edge area of the through opening to prevent axial displacement of the shaft from the through opening in order to fix the fastening element in the installed position; and wherein the component is mounted on the wall area via the fastening element;

wherein the stop is configured at a radial distance from the axis of the shaft on a lever arm of the fastening element, and the stop cooperates with an edge surface area of the wall area in the installed position; and wherein the component is attached to the fastening element by at leastone threaded screw screwed into the fastening element.

* * * * *